July 10, 1962 A. SHAFFER 3,043,187
CAMERA AND MAGAZINE
Filed March 18, 1959

INVENTOR.
Archie Shaffer
BY
Davis, Lindsey, Hibben & Noyes.
ATTORNEYS

United States Patent Office 3,043,187
Patented July 10, 1962

3,043,187
CAMERA AND MAGAZINE
Archie Shaffer, Chicago, Ill., assignor to Shaffer Brothers, Chicago, Ill., a partnership
Filed Mar. 18, 1959, Ser. No. 800,212
7 Claims. (Cl. 88—17)

The present invention relates generally to motion picture photographic film exposing equipment, and more particularly, to an improved motion picture camera and motion picture film magazine to be used therewith.

Many motion picture cameras in common use are adapted to use photographic film enclosed in a light impervious container or film magazine which can be inserted in a motion picture camera as a unit. A film magazine of the foregoing type eliminates the necessity of interchanging reels of film, as the magazine can be inserted and removed from a camera without danger of damaging the film by light and can be quickly replaced in a reverse position when it is desired to expose the remaining portion of the film. Thus, the film magazine has very substantially simplified and greatly popularized the taking of motion pictures by amateur photographers.

There remains, however, at least one troublesome aspect of successfully making motion pictures with equipment of the foregoing type. Frequently while photographing an action scene, the drive spring mechanism of a camera becomes fully unwound and before the operator can rewind the drive spring mechanism, the action is no longer in view. Also, when an action of particularly long duration is being photographed, it is almost always necessary, with present-day motion picture camera equipment, to rewind the drive spring mechanism before the action has been completely photographed. On other occasions, the operator will neglect to rewind the camera drive spring mechanism after filming a lengthy scene and when he next attempts to film an action scene the camera may not be sufficiently wound to film all or part of the action before it is necessary to rewind the drive spring mechanism.

Attempts have been made to decrease the frequency of rewinding the drive spring mechanism by using drive springs of increased strength. However, when a drive spring sufficiently strong to propel all or a substantial length of film through a camera is designed, considerable manual strength is required to wind the spring, and many individuals do not have the necessary manual strength. Thus, in view of the limitation imposed by requiring that the drive spring be wound manually in the present-day cameras, there are definite restrictions in the type of drive spring which can be employed. For example, it is essential that any drive spring housed in a camera be easily wound by pressure of the hand and fingers of the operator, and the spring must be of a size and weight which can be readily housed within the body of the motion picture camera. It is also essential that the spring used be free of wide variations in the rate of unwind, both when the spring is fully wound or substantially unwound. The foregoing limitations make it difficult to provide within a motion picture camera a satisfactory permanent-type drive spring mechanism which will completely expose a length of film contained within the standard film magazine without requiring frequent rewinding.

It is, therefore, an object of the present invention to provide a motion picture camera with a prewound drive spring mechanism which will completely expose the standard length of film contained in a film magazine without requiring rewinding the said drive mechanism.

It is a further object of the present invention to provide a film magazine for a motion picture camera which contains a drive spring mechanism which will completely expose the length of film contained in said magazine without requiring additional energizing of the drive mechanism.

Other objects of the present invention will be apparent to those skilled in the art, from the detailed description and claims to follow.

In general, the objects of the present invention are attained by providing a motion picture film magazine with an energized drive mechanism which when positioned within the camera in the usual manner engages with the gear mechanism of the camera which is substantially the same as the conventional gear mechanism but without a drive spring, and supplies all the power required to expose the film contained within the said magazine. Since it is quite general to expose one-half of the film as it passes through the camera the first time, and then reverse the film to expose the remaining half, the energized mechanism within the magazine of the present invention can be arranged in two separate units. One energized drive mechanism unit is adapted to engage the gear mechanism of the camera when exposing the first half of the strip of film, and a second energized drive mechanism unit identical to the first unit is adapted to expose the second half of the strip of film. The film magazine is thus provided with sufficient driving force to fully expose the film contained therein without requiring any re-energizing, or other attention, by the operator. With the improved film magazine of the present invention, the camera is at all times ready for instant use. Also, the energized drive mechanism in the film magazine is preferably of a type which has a relatively constant rate of discharge throughout the entire period of use so that variations in the rate of exposure of the film are minimized.

One structural means devised for achieving the objects of the present invention will be fully understood by those skilled in the art from the following detailed description and drawing wherein.

Figure 1:
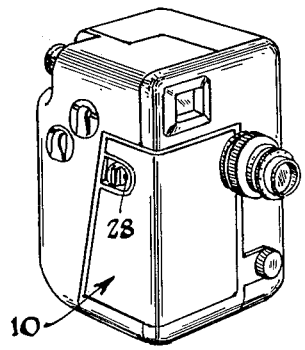
FIGURE 1 is a perspective view of a motion picture camera embodying the present invention.
Figure 2:
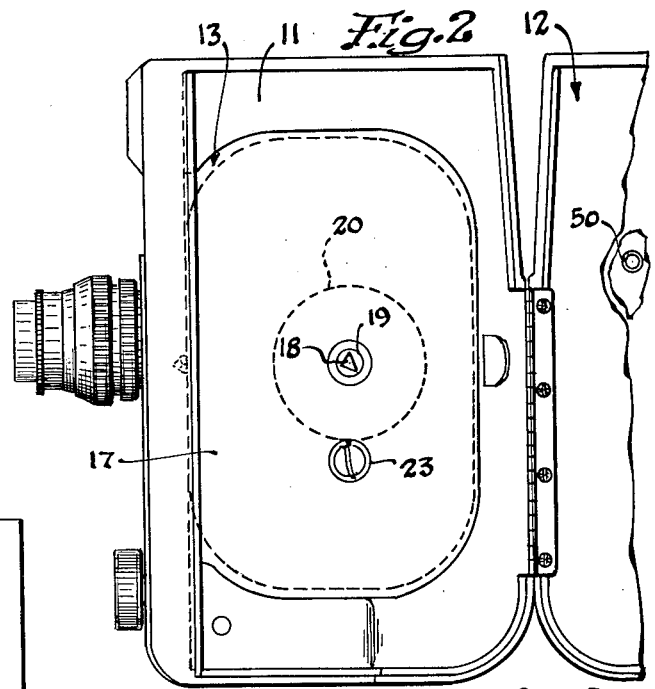
FIG. 2 is a fragmentary side elevational view of the camera of FIGURE 1, with the cover open showing the camera film magazine compartment adapted to receive a film magazine of the present invention.
Figure 3:
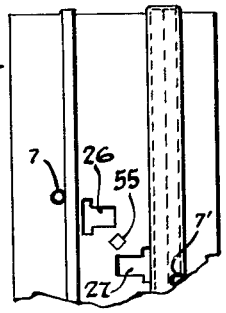
FIG. 3 is a fragmentary front elevational view of the film magazine embodying the present invention.
Figure 4:
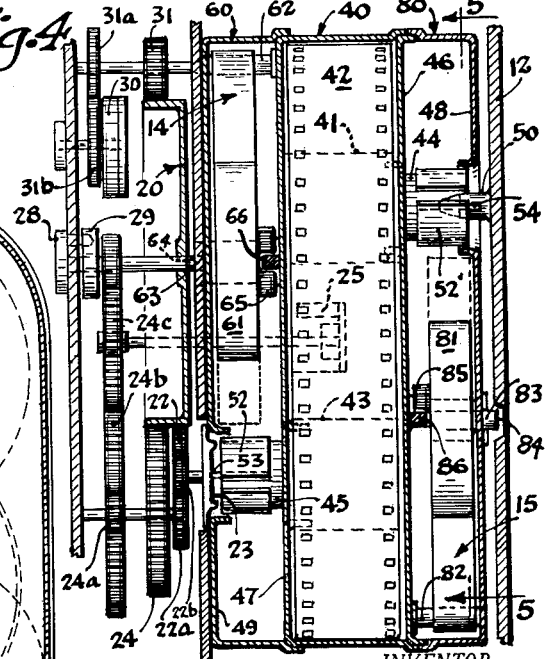
FIG. 4 is a fragmentary vertical sectional view of the film magazine of the present invention operatively disposed in the camera showing schematically the gear mechanism of the camera.
Figure 5:
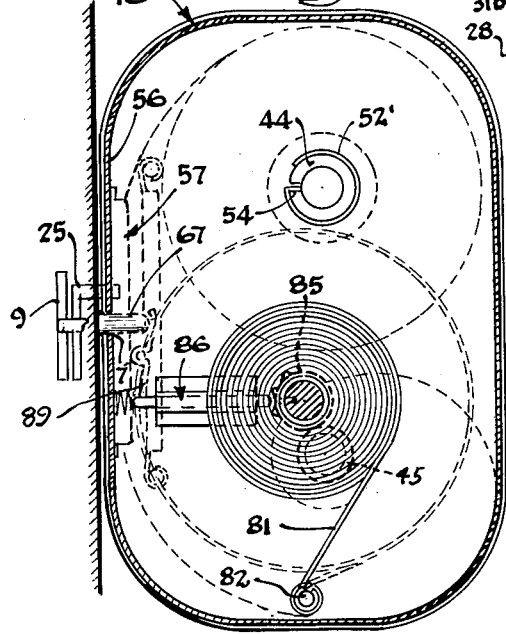
FIG. 5 is a vertical sectional view along the line 5—5 of FIG. 4.

A magazine type motion picture camera 10, having all the standard operating mechanism of a conventional motion picture camera without the usual spring drive means or other source of drive power, is shown in FIGS. 1 and 2 of the drawing, and has a body section 11 provided with a hinged door 12 which when opened (see FIG. 2) exposes a film magazine receiving compartment 13. The magazine receiving compartment 13 is preferably of the same approximate height and width as the standard film magazine but can, if desired, be enlarged to accommodate a film magazine having somewhat increased dimensions. The film compartment 13 is deeper than the corresponding film magazine compartment in the previous cameras in order to accommodate the energized drive mechanism 14, 15 disposed within the film magazine 16, as will be described in detail hereinafter. The increase in size of the film magazine compartment is preferably made without increasing the over-all size or dimensions of the conventional motion picture camera. This is possible because the somewhat bulky manually wound spring mechanism of the conventional camera can be omitted from the applicant's camera and replaced by the high energy drive mechanisms 14, 15 housed within the film magazine 16.

The inner wall 17 of the film compartment 13 has disposed centrally thereof and substantially centrally of the camera body section 11, an opening which exposes a triangular socket 18 formed in the hub 19 of a main drive sprocket wheel 20 mounted within the camera body 11. The triangular socket 18 is adapted to receive therein either of the drive shafts 63, or 83, of the energized drive mechanism 14, 15 respectively. The main drive sprocket wheel 20 which provides the driving power for the several gear trains within the camera body preferably has a relatively large diameter and corresponds to the main sprocket wheel which is associated with the conventional manually wound spring-driven camera. All other gear mechanism within the camera are driven by the said sprocket wheel 20 and are substantially the same as found in the standard manually wound spring-driven camera. Thus, gear train 22, 22a, 22b, is used to drive the conventional film takeup reel drive wheel 23, gear train 24, 24a, 24b, 24c, drives the reciprocating pawl 25 which engages the film exposed through the spaced window slot 26, 27 in the front wall 56 of the film magazine 16 in the usual manner. Also, the gear train 24, 24a, 24b, 24c, rotates the revolving shutter 9 which is positioned immediately in front of the window slots 26, 27. The operating lever or button 28 engages a revolving clutch member 29 operatively connected with the gear 24c to control the movement of the gear train and drive means, as in the conventional camera. A governor and speed control means 30 is driven by sprocket wheel 20 through gear trains 31, 31a, and 31b. It will, of course, be understood that many other gear arrangements can be used to drive the several operative mechanisms of the camera and these form no part of the present invention.

The film magazine 16 adapted to be seated in the film compartment 13 is comprised preferably of three sections: a light impervious film compartment section 40, an energized drive mechanism housing section 60 disposed on one lateral surface of the film compartment 40, and a second energized drive spring housing section 80 disposed along the other lateral surface of the film compartment 40.

The film compartment section 40 contains all the essential elements of a conventional film magazine including the customary film reel or spool 41 containing a length of unexposed or half-exposed film 42 and a film takeup reel or spool 43, each rotatably mounted on a transversely disposed film spool, axle 44, 45 respectively, which are journaled in a lateral wall section 46, 47 respectively, of the film compartment, and each extending outwardly from opposite sides of the film compartment 40 to engage in the proximate spaced outer wall or cover members 48, 49 respectively. The said cover members 48, 49 respectively, are each removably mounted on the opposite lateral walls 46, 47 respectively, of the film compartment 40. Each of the film spool axles 44, 45 is provided with a conventional spring clutch means (not shown) which locks the film spools mounted thereon against rotation until the transverse end face of the axle is depressed by a pin 50 mounted preferably on the inside of the cover 12 or on the inner wall 17 of the camera after inserting the film magazine into the camera.

The film spools 41, 43 respectively, are also provided with a conventional sleeve member 52, 52' respectively, which spring-fit about the end of the said axle. Each of the said sleeves has a projection 53, 54 respectively, extending axially outwardly therefrom which is engaged by the takeup spool drive wheel or coupling 23 mounted in the wall of the film magazine compartment and rotatably driven by the gear train 22 of the camera. The film compartment section 40 also contains on the forward wall 56 thereof, the conventional film guide and shutter means 57 which operates in co-ordination with the main camera shutter 9 and pawl means 25 when the drive spindle 55 for the shutter 9 is operatively engaged in the accommodating drive means of the camera.

Mounted between the outer wall or cover member 49 and the lateral wall section 47, is a spring drive means 61 and a corresponding spring drive means 81 identical in structure to the drive means 61 is mounted between the outer wall member 48 and the lateral wall section 46 in a diagonally opposite portion of the film magazine. The spring drive means 61 has one end thereof anchored at a post 62 extending from the walls of the drive mechanism housing section 60 and the drive means 81 has one end anchored to a corresponding post 82. The free end of the spring drive means 61 is secured to a rotatable drive shaft 63 mounted in the housing section 60 and extending outwardly through the wall member 49. The outer end 64 of the drive shaft 63 has a triangular or non-circular cross-section which enables it to make a driving connection with a correspondingly shaped socket 18 in the main drive sprocket wheel 20 of the camera. Similarly, one end of the spring drive means 81 is secured to the rotatable drive shaft 83 mounted in the housing section 80, with the outer end 84 thereof having a non-circular cross-section which enables it to make a driving engagement with the drive sprocket wheel 20 within the camera when inserted therein.

The drive shaft 63 of the drive means 61 has mounted on the inner end thereof a small diameter sprocket wheel 65 engageable with a spring actuated detent means 66 which normally holds the shaft 63 in a locked or non-rotatable position. When the film magazine 16 is operatively positioned within the film magazine compartment 13 of the camera, and after the drive shaft 63 has operatively engaged the socket 18 of the drive wheel 20, the pin 67 extending outwardly through a passage 7 in the front wall 56 of the film magazine, depresses one end of the pivotally mounted lever arm to withdraw the inner end of the spring detent means 66 from engagement with the sprocket wheel 65 and thereby permits the drive shaft 63 to rotate when the operating lever 28 of the camera is depressed in the usual manner.

In a like manner, the drive shaft 83 has a sprocket wheel 85 engageable by a spring-actuated detent means 86 which normally locks the shaft 83 against rotation. When the film magazine is inserted in the film compartment 13 and the drive shaft 83 has operatively engaged the socket 18, the pin 67 extending inwardly through the passage 7' of the front wall 56 of the film magazine depresses one end of the pivotally mounted lever arm 89 and unlocks the drive shaft 83 in the same manner as described in connection with drive shaft 63.

In assembling the film magazine prior to distribution, the film manufacturer places a length of film on the spool 41 and mounts the said spool on the axle 44 and mounts a takeup reel or spool 43 on the axle 45 while the lateral wall section 46 is removed. After threading the film through the film guide means 57 within the film compartment 40, the wall section 46 with its associated drive mechanism housing section 80 is mounted on one side of the film compartment section 40 and the drive mechanism housing section 60 is mounted on the opposite side of the film compartment section 40. When thus assembled, one of the said drive shafts extends outwardly through each of the opposite outer wall members of the film magazine.

When the film magazine 16 is loaded with film and provided with the spring drive mechanism as above described the spring drive means 61, 81 respectively are preferably wound by inserting the said magazine in a mechanical winding device which engages the spring detent means 66, 86 respectively, to unlock the drive shafts 63, 83 respectively. Thereafter, a mechanical torque is applied to each of the drive shafts 63, 83 respectively, until a predetermined torque has been applied, said torque being sufficient to enable the spring drive means 61 to drive the camera gear mechanism until the entire length of film is unwound from spool 41, passes the camera shutter means and is rewound on uptake reel 43. Likewise, the spring drive means 81 is similarly wound so as to move the entire length of film mounted on spool 43 from reel 43 past the camera shutter means and simultaneously winds the said film on spool 41 after the film magazine has been inverted and reinserted into the film magazine compartment 13.

In operation, the camera operator inserts into the film magazine compartment 13 the film magazine 16 having, for example, 25 feet of unexposed film on reel 41 with the film threaded through the film guide means and having the end thereof secured to the takeup reel 43. The magazine 16 is inserted in the compartment 13 so that the drive shaft 63 of the spring drive means 61 engages in the socket 18 of the main drive gear 20 within the camera. After the drive shaft 63 has been operatively engaged by the drive socket 18, the spring detent means 66 is withdrawn from locking position to permit the drive shaft 63 transmitting power to the drive gear 20. With the magazine 16 thus positioned in the camera magazine compartment 13, the film guide and shutter means 57 in the film compartment 40 is operatively co-ordinated with the main camera shutter 9 and the film advance pawl means 25 is in position to engage the film within the magazine 16 when the operator actuates the camera film control lever 28. After the film has been transferred from reel 41 onto reel 43 entirely by means of the spring drive means providing the sole source of power for the camera gear mechanism, the film magazine 16 is removed from the camera and reinserted into the magazine compartment 13 so that the drive shaft 83 is engaged in socket 18, whereupon spring detent means 86 is withdrawn from locking position to permit the drive shaft 83 transmitting power to the drive gear 20 of the camera. The film on reel 43 can then be exposed in the usual manner with the sole source of power being provided by the spring drive means 81.

The spring drive means 61 and 81 are each preferably comprised of a specially fabricated prestressed steel which enables the said spring means to be wound by mechanical means to a relatively great degree, whereby a long driving action can be obtained. And, since the spring drive means 61, 81, respectively, do not have to be manually wound but can be wound by mechanical power driven means, the said spring drive means can be wound to an extent which is impossible with the usual manually wound spring means so that the sole source of power required to transfer the entire length of film from one reel to the other reel in the film magazine is supplied by the spring drive means 61 and 81, respectively.

It should be understood that while in the preferred embodiment of the present invention the film magazine is provided with a spring drive mechanism disposed along two opposite lateral side walls thereof, it is also within the scope of the present invention to provide only one such spring drive mechanism where it is not necessary to reverse the film magazine to expose a second portion of the film thereon. It should also be understood that spring means other than the coil spring means illustrated can be employed to provide the driving power of the film magazine and camera. If desired, it is also contemplated that a direct gear or connection can be provided between the drive shaft 63 or 83 and the takeup reel and/or the shutter mechanism within the film compartment by providing suitable gear or drive means connecting the said drive shafts and the takeup reel or shutter mechanism. And, where it is desirable to have additional room for the spring drive means within the spring drive housing sections the axles of the reels 41 and 43 which extend tranvsversely through the said housing sections can be spaced farther from the drive shaft of the spring means by providing a gear on each of the said reels within the film compartment engaging a gear on a transverse shaft at the opposite ends of the film compartment and extending through the housing section with the end thereof adapted to make a driving connection with the drive means 23 of the camera.

While the specific embodiment of the present invention illustrated herein relates to an 8 mm. motion picture camera, it should be understood that the present invention is applicable to other motion picture cameras, such as those cameras using 16 mm. and 35 mm. film. Also, the present invention is applicable to cameras other than motion picture cameras. Thus, wherever roll film is used, such as with 35 mm. cameras, it is contemplated that the film used therein can be housed in a film magazine provided with the novel spring drive means of the present invention. Other cameras using roll film, such as the conventional box-type cameras, can also, if desired, be provided with the improved energized film magazine of the present invention.

I claim:
1. In a motion picture camera body section including film advancing and exposing means with associated gear mechanism for operating said film advancing and exposing means which is without an integral power source for driving said gear mechanism, and a film magazine compartment adapted to receive a film magazine unit, the improvement comprising a film magazine unit adapted to be removably mounted in said magazine compartment, said film magazine unit containing therein means for supporting a reel having a length of unexposed film thereon with said reel rotatably mounted on a transverse axis, and a second film reel rotatably mounted on a transverse axis spaced from the first said axis, and said magazine also having associated therewith a spring drive means out of direct engagement with said reels and adapted to rotate a drive shaft, said drive shaft being directly engageable with the said gear mechanism, and said drive means providing the entire driving power to the said gear mechanism necessary for continuously advancing and exposing the entire length of film within the said magazine unit.

2. A motion picture camera and film magazine comprising a motion picture camera with gear mechanism for moving a length of unexposed film past a lens assembly and shutter mechanism and a film magazine compartment for receiving a film magazine, said magazine having spaced lateral walls and end walls and containing a length of unexposed photographic film on a first reel rotatably mounted on a first transverse axis and a second reel spaced from said first reel which is rotatably mounted on a second transverse axle and adapted to receive thereon the film from the said first axle, means for guiding said film from said first reel to said second reel past said lens assembly and shutter mechanism, a spring drive means housing section disposed along two opposite lateral walls of the said film magazine, each said housing section having disposed therein a spring drive means out of direct driving engagement with said reels and operatively engageable with said gear mechanism of said motion picture camera, one of said spring drive means adapted to provide the said gear mechanism with the entire power required for operating said shutter mechanism and transferring continuously the film from the said first reel to the said second reel and the other of said spring drive means adapted to provide the entire power to said gear mechanism for transferring the said film continuously from the said second reel to the said first reel.

3. A motion picture camera and film magazine as in claim 2 wherein the said magazine sections are removably mounted on opposite lateral walls of said film magazine.

4. A motion picture camera film magazine adapted to be removably disposed in a magazine compartment of a motion picture camera containing gear mechanism for moving a shutter means which comprises; a film compartment section having spaced lateral side walls and end walls and containing a length of photographic film mounted on a first reel on a first transverse axle with a second reel spaced from said first reel rotatably mounted on a second transverse axle and adapted to receive thereon the film from said first reel, means for guiding said film from said first reel to said second reel past a film exposing aperture, and a spring drive mechanism housing section spaced from said reels and detachably associated with at least one of said walls of said film compartment and enclosing a spring drive mechanism which is out of direct driving engagement with said reels, said housing section having a drive shaft means adapted to be rotatably driven by said spring drive means, said drive means adapted to drivingly engage with gear mechanism within a body section of a motion picture camera spaced from said magazine compartment, and said second transverse axle of said reel adapted to be operatively engaged by said gear mechanism of the camera body section to effect rotation of said second reel, and the entire power necessary for transferring said film from said first reel to said second reel being provided by said spring drive means acting through said gear mechanism of said camera body section in which the film magazine is mounted.

5. A motion picture camera film magazine unit as in claim 4 wherein a spring drive mechanism housing section containing a said spring drive means is mounted on each of two oppositely disposed walls of said film compartment.

6. A motion picture camera film magazine adapted for use in a motion picture camera having a main body section containing gear mechanism for operating film exposing means without having an integral power source for driving said gear mechanism mounted in said main body section, and a film magazine compartment adapted to receive a film magazine therein which comprises; a film magazine adapted to be removably mounted in said magazine compartment, said film magazine having spaced walls with an elongated strip of motion picture film mounted therein on a first reel rotatably mounted on a first transverse axle, and a second reel disposed in said magazine spaced from said first reel adapted to receive said film from said first reel and rotatably mounted on a second transverse axle spaced from said first axle, at least one of said spaced axles adapted to be disposed in driving engagement with one portion of said camera gear mechanism through an opening in a wall of said film magazine, and said magazine having supportedly associated therewith out of direct driving engagement with said reels and axles thereof a self-contained drive means with a drive shaft adapted to being rotatably driven by said drive means, and said drive shaft engageable directly with said gear mechanism of said camera body section which is adapted to effect rotation of at least one of said reels; whereby said drive means provides the entire power necessary for transferring said film from one said reel to the other said reel.

7. A motion picture camera and film magazine combination comprising; a motion picture camera with a main body section having enclosed therein gear mechanism for operating film exposing means without having an integral power source for driving said gear mechanism mounted in said main body section and a film magazine compartment adapted to receive a film magazine therein, a film magazine adapted to be removably mounted in said magazine compartment, said film magazine having spaced walls with an elongated strip of motion picture film mounted therein on a first reel rotatably mounted on a first transverse axle, and a second reel disposed in said magazine spaced from said first reel adapted to receive said film from said first reel and rotatably mounted on a second transverse axle spaced from said first axle, at least one of said spaced axles adapted to be disposed in driving engagement with a portion of said camera gear mechanism through an opening in a wall of said film magazine, and said magazine having supportedly associated therewith out of direct driving engagement with said reels and axles thereof a self-contained drive means and a drive shaft adapted to being rotatably driven by said drive means, and said drive shaft engageable directly with said gear mechanism of said camera body section to effect rotation of at least one of said reels; whereby said drive means provides the entire power necessary for transferring said film from one said reel to the other said reel.

References Cited in the file of this patent

UNITED STATES PATENTS

| | | |
|---|---|---|
| 2,206,032 | Foster | July 2, 1940 |
| 2,226,363 | Williams | Dec. 24, 1940 |
| 2,293,195 | Cohen | Aug. 18, 1942 |
| 2,713,814 | Sonne et al. | July 26, 1955 |